(12) United States Patent
Rath et al.

(10) Patent No.: US 12,099,442 B2
(45) Date of Patent: Sep. 24, 2024

(54) AUTOMATIC MOVEMENT OF DEDUPED DATA TO ARCHIVAL TIERS OF CLOUD STORAGE BASED ON ACCESS PATTERNS

(71) Applicant: DELL PRODUCTS L.P., Round Rock, TX (US)

(72) Inventors: Jagannathdas Rath, Bengaluru (IN); Kalyan C Gunda, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 206 days.

(21) Appl. No.: 17/571,252

(22) Filed: Jan. 7, 2022

(65) Prior Publication Data

US 2023/0222057 A1    Jul. 13, 2023

(51) Int. Cl.
*G06F 12/02* (2006.01)
*G06F 3/06* (2006.01)

(52) U.S. Cl.
CPC ........ *G06F 12/0253* (2013.01); *G06F 3/0604* (2013.01); *G06F 3/0647* (2013.01); *G06F 3/0679* (2013.01)

(58) Field of Classification Search
None
See application file for complete search history.

(56) References Cited

U.S. PATENT DOCUMENTS 9,235,588 B1 *    1/2016   Vaikar ................. G06F 16/1752

OTHER PUBLICATIONS

"A guide to S3 Batch on AWS"; Alex DeBrie; May 6, 2019. https://www.alexdebrie.com/posts/s3-batch/ (Year: 2019).*

* cited by examiner

*Primary Examiner* — Michael Alsip
(74) *Attorney, Agent, or Firm* — WOMBLE BOND DICKINSON (US) LLP

(57) ABSTRACT

A method, apparatus, and system manages an object in a storage provider that provides a plurality of storage classes of storage. The method may include receiving a request for transfer of the object comprising segments from a first storage class to a second storage class of the storage provider; storing metadata associated with the object; determining that each of the segments satisfies a data storage policy based on the access characteristics of each of the segments within the object, wherein the determining includes: determining that none of the segments are referenced by the new segment for a predetermined time period; determining that none of the segments are accessed for the predetermined time period from the last accessed time instance; and in response to determining that each of the segments satisfies the data storage policy, transferring the object from the first storage class to the second storage class of the storage provider.

18 Claims, 11 Drawing Sheets

500 for each indicated object to be transferred, issue a Cloud API call to move the selected object from the existing Cloud Storage Class to the Archival Storage Class — 502

Update the metadata associated with the selected object locally to indicate that the selected object has been transferred to the Archival Tier — 504

FIG. 5 imaging an object on a region level in a storage provider that provides a plurality of storage classes of storage according to one embodiment.

AUTOMATIC MOVEMENT OF DEDUPED DATA TO ARCHIVAL TIERS OF CLOUD STORAGE BASED ON ACCESS PATTERNS

FIELD OF THE INVENTION

Embodiments of the present invention relate generally to backup applications. More particularly, embodiments of the invention relate to a method for automatic migration of deduped data to archival storage class of cloud storage providers based on the backup server usage patterns.

BACKGROUND

As cloud technology is becoming more accessible, cloud storage class ("cloud tier") has become a common practice for direct backup applications, deduplication (dedupe) and non-deduplication (non-dedupe), to store data off-premise for long term retention purposes. In a dedupe backup system, a file is split into segments and these segments are deduped across all files in the system. These unique segments are packed into containers and then loaded to a cloud as objects varying around few Megabytes (MBs) in size. Whereas in non-dedupe backup systems, the files may be directly moved as a whole unit of data to a cloud or split into multiple objects/chunks and then moved to the cloud. The movement of these data to the cloud is generally governed by various policies that can be configured in the backup servers. For example, "move all files older than two weeks to cloud."

BRIEF DESCRIPTION OF THE DRAWINGS

Embodiments of the invention are illustrated by way of example and not a limitation in the figures of the accompanying drawings in which like references indicate similar elements.

FIG. 5 is a flow diagram illustrating a method for directly moving marked objects to a second storage class of the storage provider according to one embodiment.

DETAILED DESCRIPTION

Figure 1A:
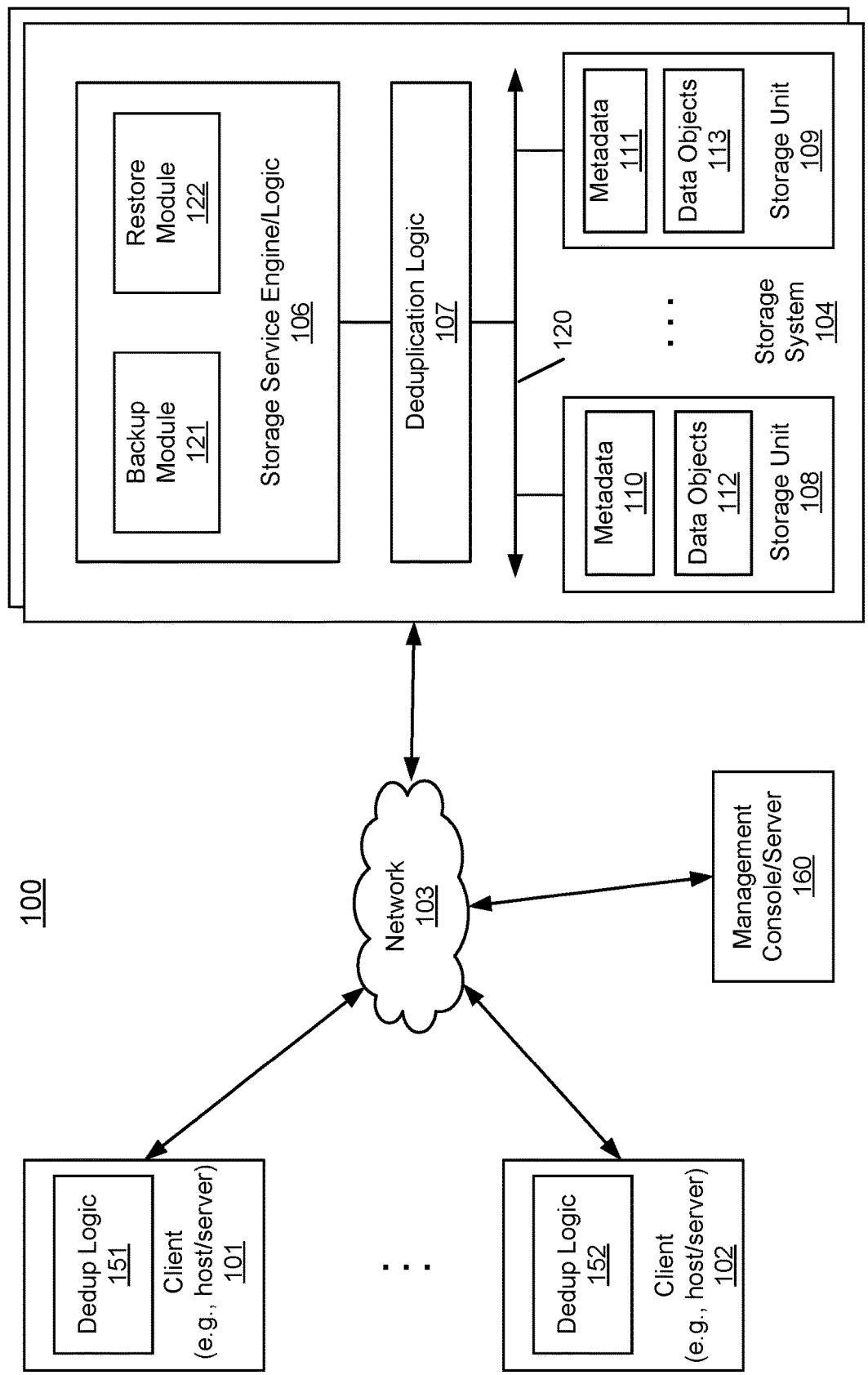
FIG. 1A is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Traditionally, transferring non-dedupe data to an archival tier of cloud storage providers is easy to achieve because the cloud object may not be referenced by more than one file. However, transferring an object having dedupe data is challenging because each segment within the object cloud may be shared or referenced by multiple different files. In addition, new incoming files may dedupe to existing segments in future time. Further, each segment within the object may have been accessed or referenced at different times. New incoming files may reference or dedupe to existing old segments. Some segments may not have been accessed at all in the last 30 days, for example, while other segments may have been accessed within last few days.

In addition, the cloud storage providers offer various methods to automatically move a cloud object from one tier or storage class to another based on factors including, the last accessed time, the creation time etc. For example, intelligent tier method may simply move the object into the archival/non-frequent tier, if the objects are not accessed for a certain duration (e.g., 30 days). Object Lifecycle Policy method may move the object to the archival tiers after a certain duration (e.g., 30 days) from when the object is created. The cloud provider's life cycle management options or intelligent tiers may work well with the non-dedupe applications.

Transferring objects having dedupe data based on the object's last access time or creation time would be a challenging task because one or more segments may still need to remain accessible by the backup application within the first few days of ingest (e.g., 30 days). The automatic movement method provided by the cloud storage providers may not work for dedupe backup servers. This problem is widely applicable to Cloud Native deployments like Data Domain Active Tier on Object Storage (ATOS) Data Domain Virtual Editions (DDVEs) (Virtual Machine instances), where objects of Active/Local Tier exist in the S3 Cloud Buckets instead of local disks.

Embodiments of the disclosure relate to a method, apparatus, and system for managing an object having deduplicated data in a storage provider that provides a plurality of storage classes of storage. The embodiments of the present disclosure provide an improved solution to automatically move objects to an archival tier, if none of the segments within the object is referenced (i.e. new incoming segments deduping to existing segments in the object) or accessed within a predetermined period (inactivity duration), for example, thirty (30) days.

Embodiments of the present disclosure propose an improved solution for automatically transferring dedup data from the standard storage class to a cost-effective archival storage class based on access patterns of the segments within the object. In this way, this solution can avoid moving dedup data from the standard storage class to any cost-effective archival storage class based on fixed factors such as creation date or last accessed time.

This solution also supports scenarios, where same segments are referenced by new segments again in the future. This solution solely relies on the principles of operational copies versus Long Term Retention copies and their expectations. The solution ensures archival tier does not receive duplicated data at any point of time, thereby keeping the cost under control. With this solution, deduplication systems may be able to lower the total cost of ownership (TCO) in cloud automatically. The solution can work with object level tracking and can be extended to segment level tracking.

According to one aspect, the backup server may receive a request for transfer of the object comprising segments from a first storage class to a second storage class of the storage provider. The backup server may store metadata associated with the object, the metadata indicating access characteristics of each of the segments within the object, the access characteristics including a last referenced time instance when each of the segments was last referenced by a new segment and a last accessed time instance when each of the segments was last accessed. The backup server may determine that each of the segments satisfies a data storage policy based on the access characteristics of each of the segments within the object. In response to determining that each of the segments satisfies the data storage policy, the backup server may transfer the object from the first storage class to the second storage class of the storage provider.

In one embodiment, in determining that each of the segments satisfies a data storage policy based on the access characteristics of each of the segments within the object, the backup server may determine that none of the segments are referenced by the new segment for a predetermined time period. The backup server may determine that none of the segments are accessed for the predetermined time period from the last accessed time instance.

In a particular embodiment, in determining that each of the segments satisfies the data storage policy based on the access characteristics of each of the segments within the object, the backup server may determine the last referenced time instance when each of the segments was last referenced by the new segment. Additionally, the backup server may determine the last accessed time instance when each of the segments was last accessed. The backup server may indicate the object to be transferred from the first storage class to the second storage class of the storage provider.

In one embodiment, in indicating the object to be transferred from the first storage class to the second storage class of the storage provider, the backup server may update a flag in one of fields in the metadata associated with the object.

In one embodiment, the backup server may perform a garbage collection operation or any independent process. The backup server may determine, during the garbage collection (GC) operation, that the last referenced time instance when each of the segments was last referenced by the new segment exceeds a predetermined inactivity duration. The backup server may determine, during the GC operation, that the last accessed time instance when each of the segments was last accessed exceeds the predetermined inactivity duration indicating, during the GC operation, the object to be transferred from the first storage class to the second storage class of the storage provider.

In one embodiment, for each indicated object to be transferred, the backup server may issue an application programming interface (API) call to transfer the object from the first storage class to the second storage class of the storage provider. The backup server may update the metadata of the object to indicate that the object is located in the second storage class of the storage provider.

In one embodiment, the backup server may maintain a manifest list comprising at least one indicated object to be transferred. The backup server may invoke a batch operation to transfer at least one indicated object listed in the manifest list.

In one embodiment, the backup server may generate a new copy of each of the segments in the first storage class if each of the segments within the second storage class is referenced by the new segment at a future time. The backup server may determine whether the last referenced time instance when each of the segments is referenced by the new segment exceeds the predetermined inactivity duration. The backup server may determine whether the last accessed time instance when each of the segments is accessed exceeds the predetermined inactivity duration. The backup server may determine whether the new copy of each of the segments in the first storage class is already in the second storage class. In response to determining the new copy of each of the segments in the first storage class is already in the second storage class, the backup server may indicate that the object is not eligible to be transferred to the second storage class. In response to determining that the new copy of each of the segments in the first storage class is not already in the second storage class, the backup server may indicate the object is eligible to be moved to the second storage class.

In one embodiment, the backup server may add counters for each segment. The backup server may update a respective counter associated with each segment, when any segment is referenced by the new segments and/or is accessed for the read operations. The backup server may determine whether any segment is referenced by the new segments within a predetermined threshold. In response to determining that any segment is referenced by the new segments within the predetermined threshold, the backup server may determine whether any segment is accessed for read operations within the predetermined threshold. In response to determining that any segment is not referenced by the new segments and not accessed for the read operations within the predetermined threshold, the backup server may copy the segment to a new object. The new object may be moved to the second storage class. In one embodiment, a region may include the segments of the object. The backup server may add counters for the region comprising the segments. The backup server may update a respective counter associated with each region, when any segment within the region is referenced by the new segments and/or is accessed for the read operations. The backup server may determine whether any segment within the region is referenced by the new segments within a predetermined threshold. In response to determining that any segment within the region is referenced by the new segments within the predetermined threshold, the backup server may determine whether any segment within the region is accessed for read operations within the predetermined threshold. In response to determining that any segment within the region is not referenced and not accessed for the read operations by the new segments within a predetermined threshold, the backup server may copy the region to a new object. The new object may be moved to the second storage class.

In one embodiment, the backup server may add counters for the object. The backup server may update a respective counter associated with each segment when any of the segments within the object is referenced by the new segments and/or accessed for read operations. The backup server may determine whether any segment within the object is referenced by the new segments within a predetermined threshold. In response to determining that any segment within the object is referenced by the new segments within the predetermined threshold, the backup server may determine whether any segment within the object is accessed for read operations within the predetermined threshold. In response to determining that any segment within the object is not referenced and not accessed for the read operations by the new segments within the predetermined threshold, the backup server may indicate that the object is eligible to be moved to the second storage class.

In another aspect of the disclosure, embodiments of the present disclosure also provide a non-transitory machine-readable medium and a data processing system to perform the processes as described above.

Hereinafter, specific examples of the present solution will be described in more detail with reference to FIG. 1A through FIG. 9. FIG. 1A is a block diagram illustrating a storage system according to one embodiment of the invention. Referring to FIG. 1A, system 100 includes, but is not limited to, one or more client systems 101-102 communicatively coupled to storage system 104 over network 103. Clients 101-102 may be any type of clients such as a host or a server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of network such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., backup servers or cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with new content, a new data block is created containing the new updated content. Mapping of the deduplicated block is then changed to point to the new data block and the deduplicated block no longer points to the single copy of the data. This process is referred to as deduplication.

Data deduplication can operate at a file or a block level. File deduplication eliminates duplicate files (as in the example above), but block deduplication processes blocks within a file and saves a unique copy of each block. For example, if only a few bytes of a document, a presentation, or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and a deduplication key for each data block. When two data blocks have the same digest they have a sufficiently high probability of containing the same data to warrant a bit-for-bit comparison to confirm they are exact duplicates.

Referring to FIG. 1A, a goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in an index table along with the digest for the data block.

A deduplication key uniquely identifies a data block by storing information (such as logical address, physical address) of the data block. Deduplication logic 107 identifies data blocks that can potentially be deduplicated by comparing digests of data blocks with a list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

In one embodiment, referring back to FIG. 1A, any of clients 101-102 may further include a deduplication logic (e.g., deduplication logic 151-152) having at least a portion of functionalities of deduplication logic 107. Deduplication logic 151-152 are configured to perform local deduplication operations, respectively. For example, prior to transmitting data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may have been previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Figure 1B:
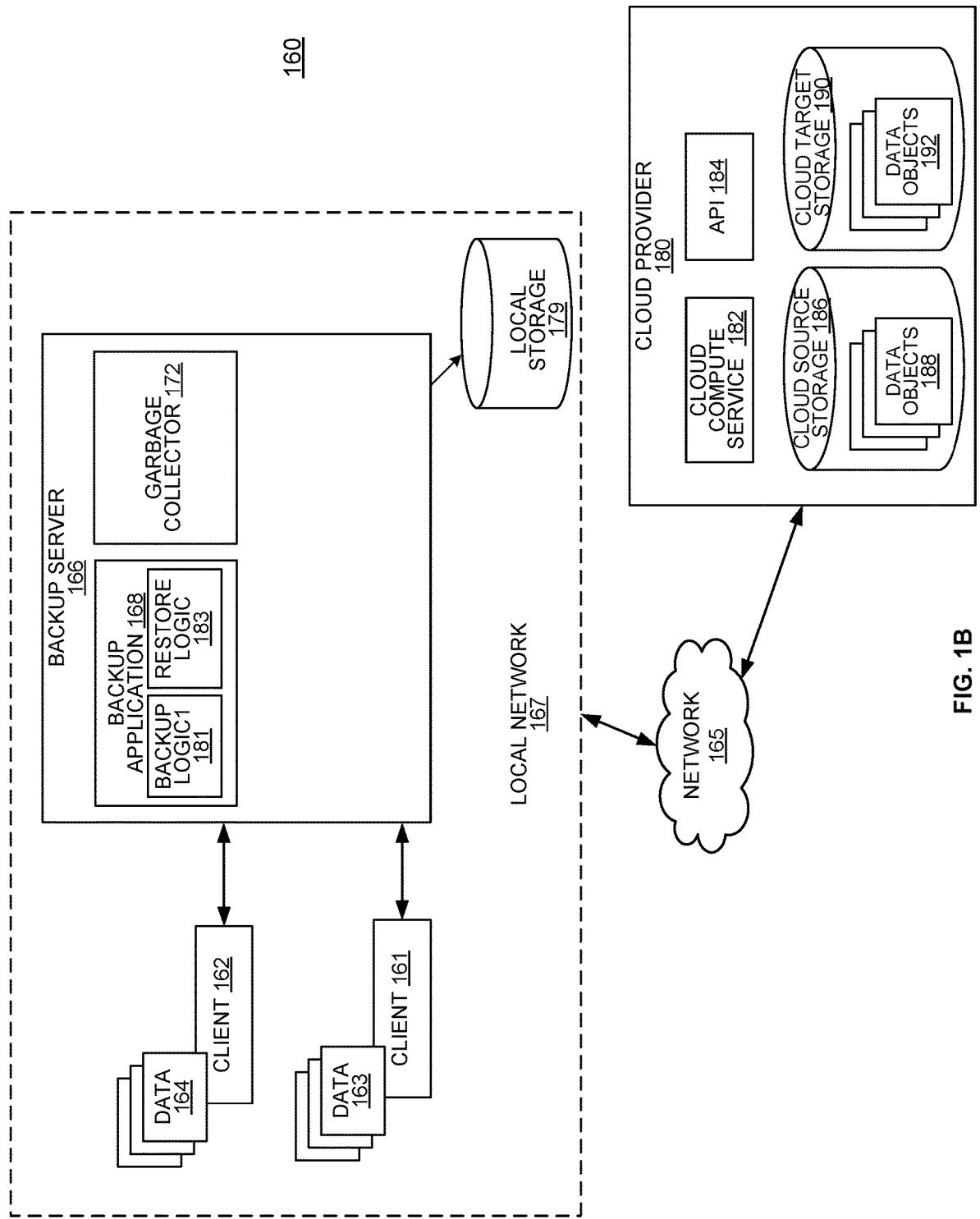
FIG. 1B is a block diagram illustrating an example environment in which embodiments of the disclosure may be practiced.

FIG. 1B is a block diagram illustrating an example of a networked environment 160 in which embodiments of the disclosure may be practiced. Referring to FIG. 1B, the networked environment 160 may include, but is not limited to, a plurality of clients 161-162, a backup server 166, a network 165, a local network 167, and a cloud provider 180. The networked environment 160 may represent a deduplication system. The plurality of clients 161-162 having data 163 and 164 stored therein, respectively, may be any type of client such as a host or server, a personal computer (e.g., desktops, laptops, and tablets), a "thin" client, a personal digital assistant (PDA), a Web enabled appliance, or a mobile phone (e.g., Smartphone), etc. Alternatively, any of the plurality of clients 161-162 may be a primary storage system (e.g., local data center) that provides storage to other local clients, which may periodically back up the content stored therein to a backup storage system (e.g., a disaster recovery site or system), such as a local storage 179. Local network 167 and network 165 may be any type of network such as a local area network (LAN), a wide area network (WAN) such as the Internet, a fiber network, a storage network, or a combination thereof, wired or wireless. The plurality of clients 161-162 may be in physical proximity or may be physically remote from one another. The local storage 179 may be located in proximity to one, both, or neither of clients 161-162. Therefore, the client 161-162 may be a backup client of the backup server 166. Client 161-162, the backup server 166, and local storage 179 may be communicatively connected to one another via the local network 167. Client 161-162, the backup server 166, and local storage 179 may be communicatively connected to the cloud provider via the network 165.

The backup server 166 may represent the storage system 104 (FIG. 1A) and include, but may not be limited to, backup application 168, and garbage collector 172. The backup server 166 utilizes one or more cloud storages to move data regularly for long term retention. The backup server 166 performs a variety of cloud operations, for example, moving new data to the cloud, reading existing cloud data, performing garbage collection-based cleanups, deleting cloud data, obtaining object's metadata only, listing objects, performing batch jobs, etc.

In one embodiment, backup application 168 may be separate from the backup server 166. For example, backup application 168 may include backup logic 181 and restore logic 183. Backup logic 181 is configured to receive and backup data from a client (e.g., clients 161-162) and to store the backup data in the local storage 179. Restore logic 183 is configured to retrieve and restore backup data from the local storage 179 back to a client (e.g., clients 161-162). The backup server 166 may back up data stored on the local storage 179. The local storage 179 may be a part of the backup server 166 or separate from the backup server 166. The backup server 166 may initiate backup operations in response to requests from clients 161-162. The backup application 168 can also be an independent system outside of the backup server 166 and can coordinate a backup operation between clients 161 and 162 and the backup server 166. In one embodiment, a client 162, for example, may transmit a request for a backup process for data 164 (e.g., a set of files) to the backup application 168. After receiving the request from the client 162, the backup application 168 may initiate a backup operation of data 164 and the data 164 is copied to the local storage 179 from the client 162. The backup server 166, may then initiate data movement of the data stored in the local storage 179 to the cloud source storage 186 based on various defined data movement policies.

The local storage 179 may be implemented locally (e.g., single node operating environment) or remotely (e.g., multi-node operating environment) via interconnect (not shown), which may be a bus and/or a network (e.g., a storage network or a network similar to local network 167). The local storage 179 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. The local storage 179 may be located locally or be remotely accessible over a network. According to one embodiment, the garbage collector 172 may be configured to perform garbage collection (GC) process.

The cloud provider 180 may include cloud compute service 182, API 184, cloud source storage 186 storing data objects 188, and cloud target storage 190 storing data objects 192. Although one cloud provider 180 is shown, more than one cloud provider can be supported in this network environment 160. In one embodiment, for example, the cloud provider 180 can be deployed in a cloud environment as a server of a cloud service provider. The cloud provider 180 provides cloud services over a network that is open for public use, such as the Internet. The cloud provider 180 may be a public cloud service provider such as Amazon Web Services® (AWS), Microsoft Azure®), IBM Cloud, or Google Cloud Platform (GCP). In another embodiment, the cloud provider 180 may be a private cloud that is located at a client's premise. In some embodiments, various operations of the cloud source storage 186 and the cloud target storage 190 on the cloud provider 180 may be managed by a cloud compute service 182. The cloud source storage 186 and the cloud target storage 190 may be hosted on one or more data centers including any number of storage devices as will be appreciated by one ordinarily skilled in the art. The cloud provider 180 may include or represent any type of servers or a cluster of one or more servers (e.g., cloud servers). For example, cloud provider 180 may be a storage server used for various different purposes, such as to provide multiple users or client systems with access to shared data and/or to back up (or restore) data (e.g., mission critical data). The cloud provider 180 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fiber channel (FC) protocol, etc. The cloud provider 180 may further provide storage services via an object-based protocol like S3, Hadoop distributed file system (HDFS) protocol, or the like.

In one embodiment, cloud compute service 182 (also referred to as service logic, service module, or service unit), may be implemented in software, hardware, or a combination thereof. Cloud compute service 182 may also represent any storage service related components configured or adapted to provide storage services (e.g., storage as a service) to a variety of clients using any of the access protocols set forth above.

The cloud compute service 182 of the cloud provider 180 may receive the request for data movement process from the backup server 166. During the backup operations, the backup server 166 may retrieve data that is to be backed up from the local storage 179 and may transfer the data to the cloud source storage 186 in the cloud provider 180 for backup storage on the cloud.

The cloud provider 180 may include public cloud providers such as Amazon Web Services® (AWS), Microsoft Azure®), IBM Cloud, or Google Cloud Platform (GCP). These cloud providers may provide S3 storage under a variety of classes. The storage classes may include Geographical Region based (e.g. US-East-1, US-West-1, AP-East-1 etc.). The storage classes may also include storage class/tiers based on access times, cost, and minimum storage durations. For example, storage class/tiers may be divided into (i) standard/hot tier for more frequently accessed data; (ii) cold tier for less frequently accessed data; (iii) archive tier for almost not accessed data for many months up to a year; and (iv) deep archive tier for data not accessed for years.

The storage classes may also include intelligent tiers. These tiers, for example, AWS Intelligent Tier that can move data automatically to the next less costly/slow access tier if data are not accessed for a certain number of days, e.g., 30 days, 90 days, 180 days, etc. However, these tiers generally require monthly monitoring and auto-tiering costs. These tiers must wait for the waiting period of each next tier in order to move data to the last archival tier. All these tiers come with their own costs and minimum billing durations.

It should be appreciated that clients 161-162, the backup server 166, and the cloud provider 180 may have access to the network 165 (e.g., a public network), through which they may communicate with each other. Therefore, under the coordination of the backup server 166, the data from clients 161-162 may be backed up by the backup application 168 in the local storage 179. Then, according to a predefined policy, the backup server 166 may move the data from the local storage 179 to the cloud source storage 186.

Various methods according to embodiments of the present disclosure may be implemented at the backup server 166. It should be understood that the structure of the system 100 is described for exemplary purposes only, and does not imply any limitation on the scope of the present disclosure. For example, the embodiments of the present disclosure can also be applied to a system different from the system 100. It should be understood that the specific number of various devices is given for illustrative purposes only and does not imply any limitation on the scope of the disclosure. For example, embodiments of the present disclosure may also be applied to more or fewer devices.

Methods 200 through 900 will be described in detail below with reference to FIG. 1B. For example, methods 200 through 900 can be performed by a plurality of modules in a backup server 166, which can be implemented in software, firmware, hardware, or any combination thereof. It should be understood that the methods 200 through 900 may also be performed by other devices, and the scope of the present disclosure is not limited in this regard. It should also be understood that the methods 200 through 900 may also include additional acts not shown and/or the acts shown may be omitted, and the scope of the present disclosure is not limited in this regard.

Figure 2:
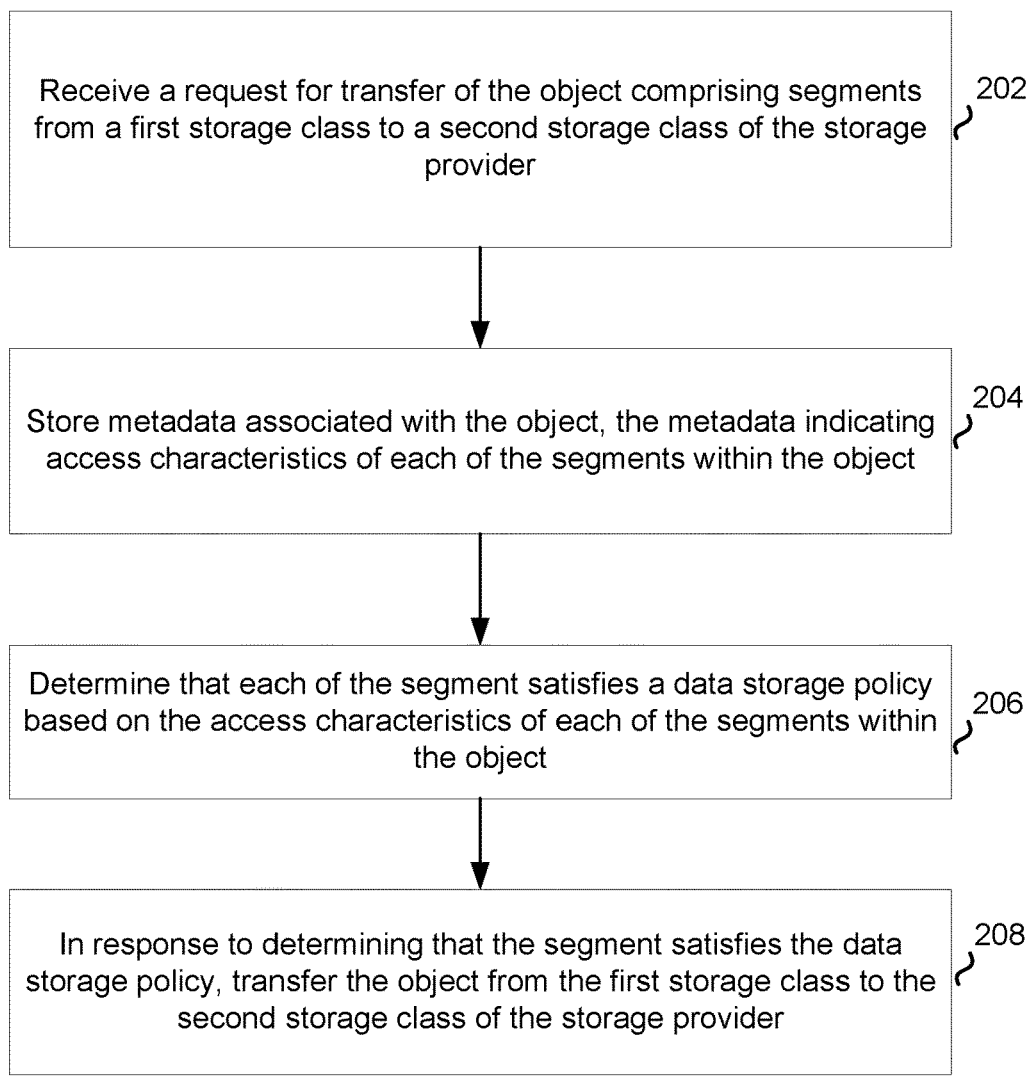
FIG. 2 is a flow diagram illustrating a method for managing an object having deduplicated data in a storage provider that provides a plurality of storage classes of storage according to one embodiment.

FIG. 2 is a flow diagram illustrating methods 200 for managing an object having deduplicated data in a storage provider that provides a plurality of storage classes of storage according to one embodiment. Referring now to FIG. 2, at block 202, the backup server 166 may receive a request for transfer of the object including segments from a first storage class to a second storage class of the storage provider. The object may be currently stored in a first storage class of a first storage provider that provides a plurality of storage classes of storage. The object may refer to deduped cloud object.

At block 204, the backup server 166 may store metadata associated with the object. The metadata may indicate access characteristics of each of the segments within the object. The access characteristics may include a last referenced time when each of the segments was last referenced by a new segment and a last accessed time instance when each of the segments was last accessed.

In one embodiment, the metadata may include two additional metadata for each cloud object. For example, the first metadata may store a first variable of "the last referenced time" that may represent the time when any segment within the object was last referenced by new incoming segments in the deduplication system. The second metadata may store a second variable of "the last accessed time" that may represent the time when any of segment within the object was last accessed by the deduplication system. For example, "the last accessed time" may refer to the time when any of the segments within the object was last accessed by reading operation. These first and second variables may store "the last referenced time" and "the last accessed time" in epoch seconds.

At block 206, the backup server 166 may determine that each of the segments satisfies a data storage policy based on the access characteristics of each of the segments within the object. In one embodiment, for example, in determining that each of the segments satisfies a data storage policy based on the access characteristics of each of the segments within the object, the backup server 166 may determine that none of the segments are referenced by the new segment for a predetermined time period. In addition, the backup server 166 may determine that none of the segments are accessed for the predetermined time period from the last accessed time instance.

At block 208, in response to determining that each of the segments satisfies the data storage policy, the backup server 166 may transfer the object from the first storage class to the second storage class of the storage provider.

Figure 3:
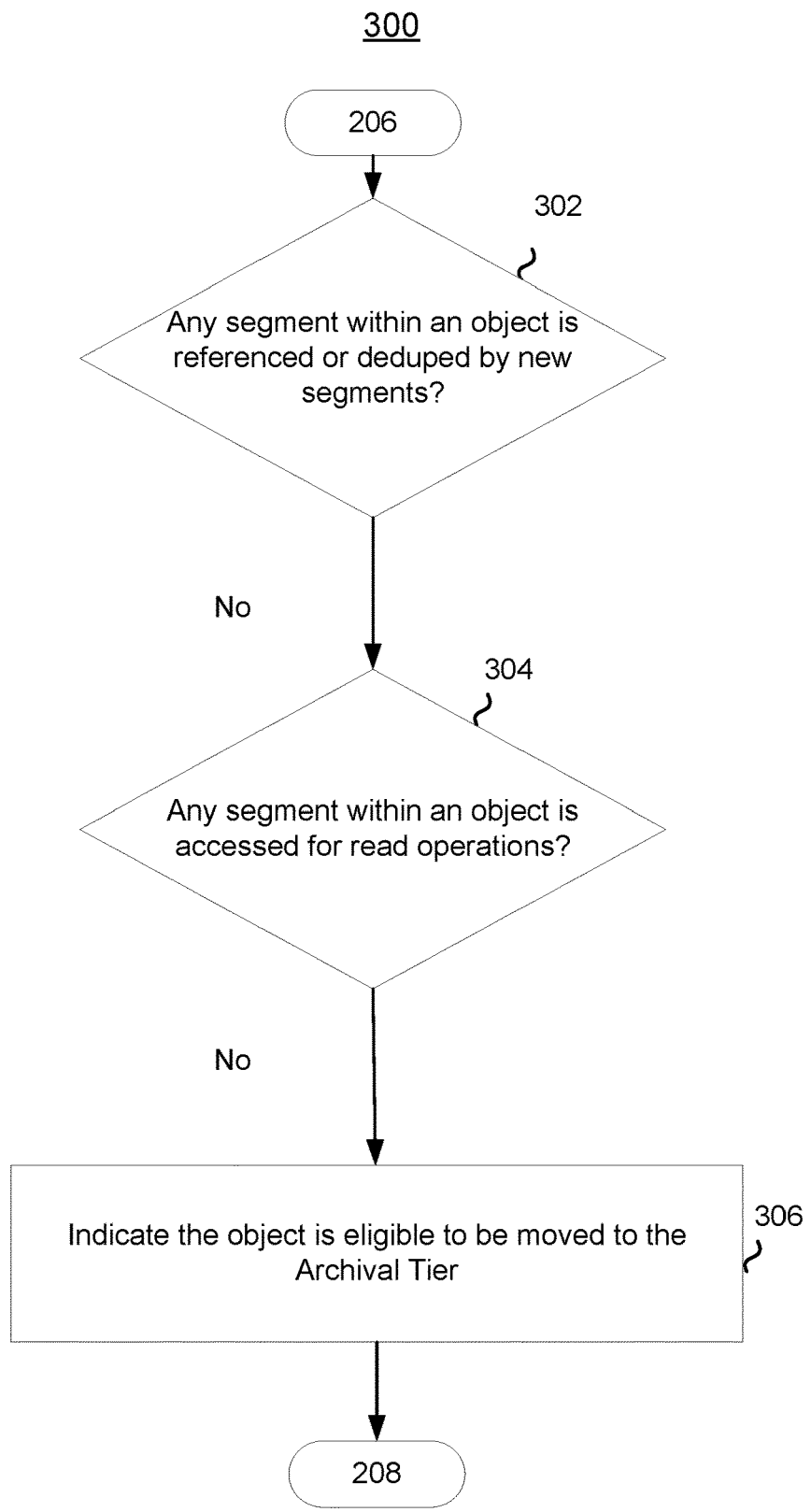
FIG. 3 is a flow diagram illustrating a method for determining that a segment satisfies data storage policy based on the access characteristics according to one embodiment.

FIG. 3 is a flow diagram illustrating a method 300 for determining that a segment satisfies data storage policy based on the access characteristics according to one embodiment. Referring now to FIG. 3, at block 302, in determining that each of the segments satisfies the data storage policy based on the access characteristics of each of the segments within the object, the backup server 166 may determine the last referenced time instance when each of the segments was last referenced by the new segment.

At block 304, the backup server 166 may determine the last accessed time instance when each of the segments was last accessed.

At block 306, the backup server 166 may indicate the object to be transferred from the first storage class to the second storage class of the storage provider. For example, if no segments within the object are referenced, deduped or accessed for the predetermined threshold (e.g., inactivity duration), then the "last referenced time" and the "last accessed time" values associated with the object will indicate thirty (30) days or more. Therefore, this may indicate that the object is eligible to be moved to the archival tier. In one embodiment, the predetermined threshold may be 30 days. In another embodiment, the predetermined threshold may be set according to a user preference.

Figure 4:
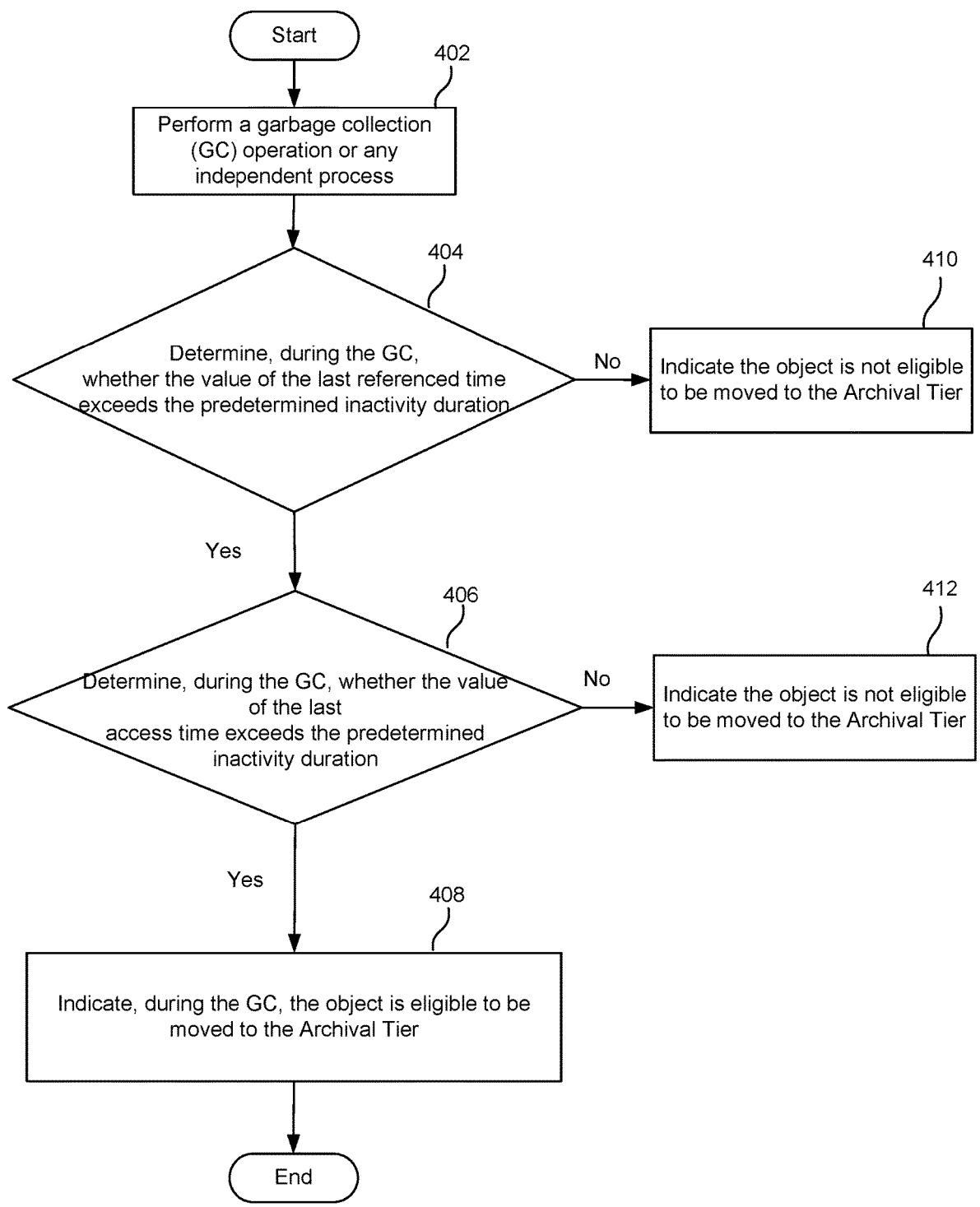
FIG. 4 is a flow diagram illustrating a method performed by a garbage collection (GC) process for determining whether an object is eligible to be transferred to a second storage class of the storage provider according to one embodiment.

FIG. 4 is a flow diagram illustrating a method performed by a garbage collection (GC) process for determining whether an object is eligible to be transferred to a second storage class of the storage provider according to one embodiment. Referring to FIG. 4, at block 402, the backup server 166 may perform a garbage collection (GC) operation. Alternatively, the method described in FIG. 4 can be performed by an independent process.

At block 404, the backup server 166 may determine, during the garbage collection (GC) operation, whether the last referenced time instance when each of the segments was last referenced by the new segment exceeds a predetermined inactivity duration.

At operation 410, if it is determined that the last referenced time instance when each of the segments was last referenced by the new segment does not exceed a predetermined inactivity duration, the backup server 166 may indicate the object is not eligible to be transferred from the first storage class to the second storage class of the storage provider.

At block 406, in response to determining that the last referenced time instance when each of the segments was last referenced by the new segment exceeds a predetermined inactivity duration, the backup server 166 may determine, during the GC operation, whether the last accessed time instance when each of the segments was last accessed exceeds the predetermined inactivity duration.

At operation 412, if it is determined that the last accessed time instance when each of the segments was last accessed does not exceed a predetermined inactivity duration, the backup server 166 may indicate that the object is not eligible to be transferred from the first storage class to the second storage class of the storage provider.

At block 408, in response to determining that both the last referenced time instance when each of the segments was last referenced by the new segment and the last accessed time instance when each of the segments was last referenced by the new segment exceed a predetermined inactivity duration, the backup server 166 may indicate, during the GC operation, the object to be transferred from the first storage class to the second storage class of the storage provider.

In this example, when a cloud GC operation is performed, the backup server 166 may additionally check the values of the "last referenced time" and the "last accessed time" value of each live object. If both the "last referenced time" and the "last accessed time" values exceed the predetermined threshold (inactivity duration) (e.g., 30 days), then the backup server 166 may indicate the object to be moved to the archival tier.

In one embodiment, in indicating the object to be transferred from the first storage class to the second storage class of the storage provider, the backup server 166 may update a flag in one of the fields in the metadata associated with the object. To indicate the object to be transferred from the first storage class to the second storage class of the storage provider, the backup server 166 may update a flag in the metadata associated with the object with a special flag such as, "MOVE TO ARCHIVAL".

In one embodiment, the predetermined threshold (inactivity duration) can be configured based on the policy set in the backup application. For example, the predetermined threshold (inactivity duration) may be determined in the backup application based on operational copies of data. Operational copies of data may represent copies from which data are restored in times of failure. In another example, the predetermined threshold (inactivity duration) may be determined in the backup application based on the long term retention copies. Long term retention copies may represent data that may be kept long term for compliance purposes and accessed for regulatory purposes but may not be candidates for recovery.

Typically, recoveries can happen from the operational copies of data within the predetermined threshold (e.g., 30 days). The backup application may access data to validate the backup operation within the predetermined threshold.

After the recoveries, the data are generally retained for compliance or regulatory purposes and may not be expected to be accessed frequently and therefore the data may be transferred to the archival tiers for economic benefits.

FIG. 5 is a flow diagram illustrating a method for directly moving marked objects to a second storage class of the storage provider according to one embodiment. Referring now to FIG. 5, at block 502, for each indicated object to be transferred, the backup server 166 may issue an application programming interface (API) call to transfer the object from the first storage class to the second storage class of the storage provider. For example, once cloud GC marks an object to be moved to the archival tier, the deduplication system may ensure that the object is transferred to the archival tier. The deduplication system may have an independent process or thread running to perform this task.

The backup server 166 may iterate over all the objects in the deduplication system and select the object marked as "MOVE TO ARCHIVAL." For each object, the backup server 166 may issue a cloud API call to transfer the object from the current cloud storage class to the archival storage class (e.g., for AWS, from the Standard to Glacier Storage Class).

At block 504, the backup server 166 may update the metadata of the object to indicate that the object is located in the second storage class of the storage provider. For example, the backup server 166 may update the metadata of the object locally to indicate that the object is now located in the archival tier.

Figure 6:
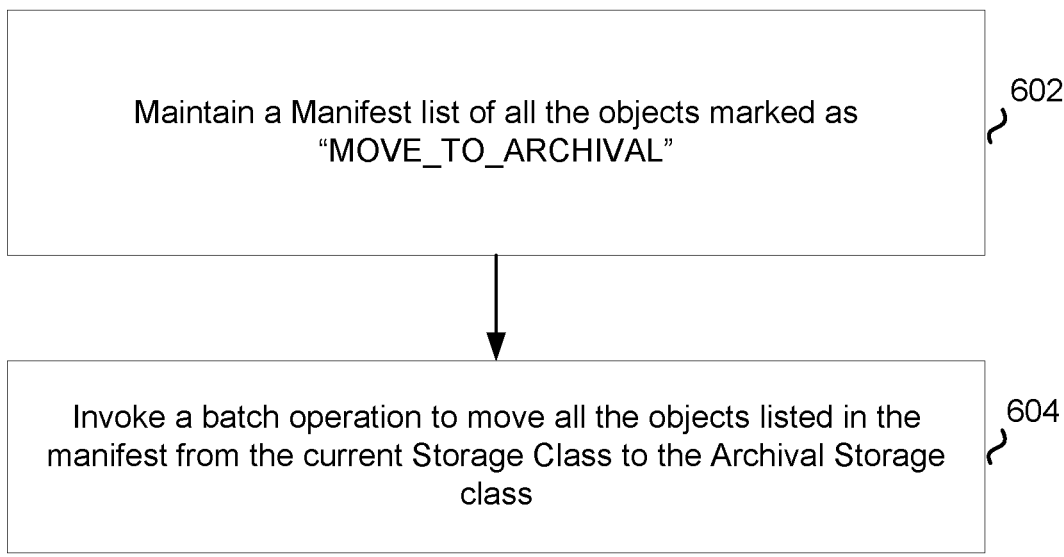
FIG. 6 is a flow diagram illustrating a method for moving marked objects in a batch operation to a second storage class of the storage provider according to one embodiment.

FIG. 6 is a flow diagram illustrating a method for moving marked objects in a batch operation to a second storage class of the storage provider according to one embodiment. Referring now to FIG. 6, at block 602, the backup server 166 may maintain a manifest list comprising at least one indicated object to be transferred.

At block 604, the backup server 166 may invoke a batch operation to transfer the at least one indicated object listed in the manifest list.

For example, the backup server 166 may prepare a manifest list of all the objects marked as "MOVE TO ARCHIVAL." Then, the backup server 166 may utilize the manifest list to invoke a batch operation to move all the objects listed in the manifest list from the current storage class to the desired Archival Storage class (e.g., AWS batch operations). In this manner, the total number of cloud transactions may be reduced from the deduplication system.

Figure 7:
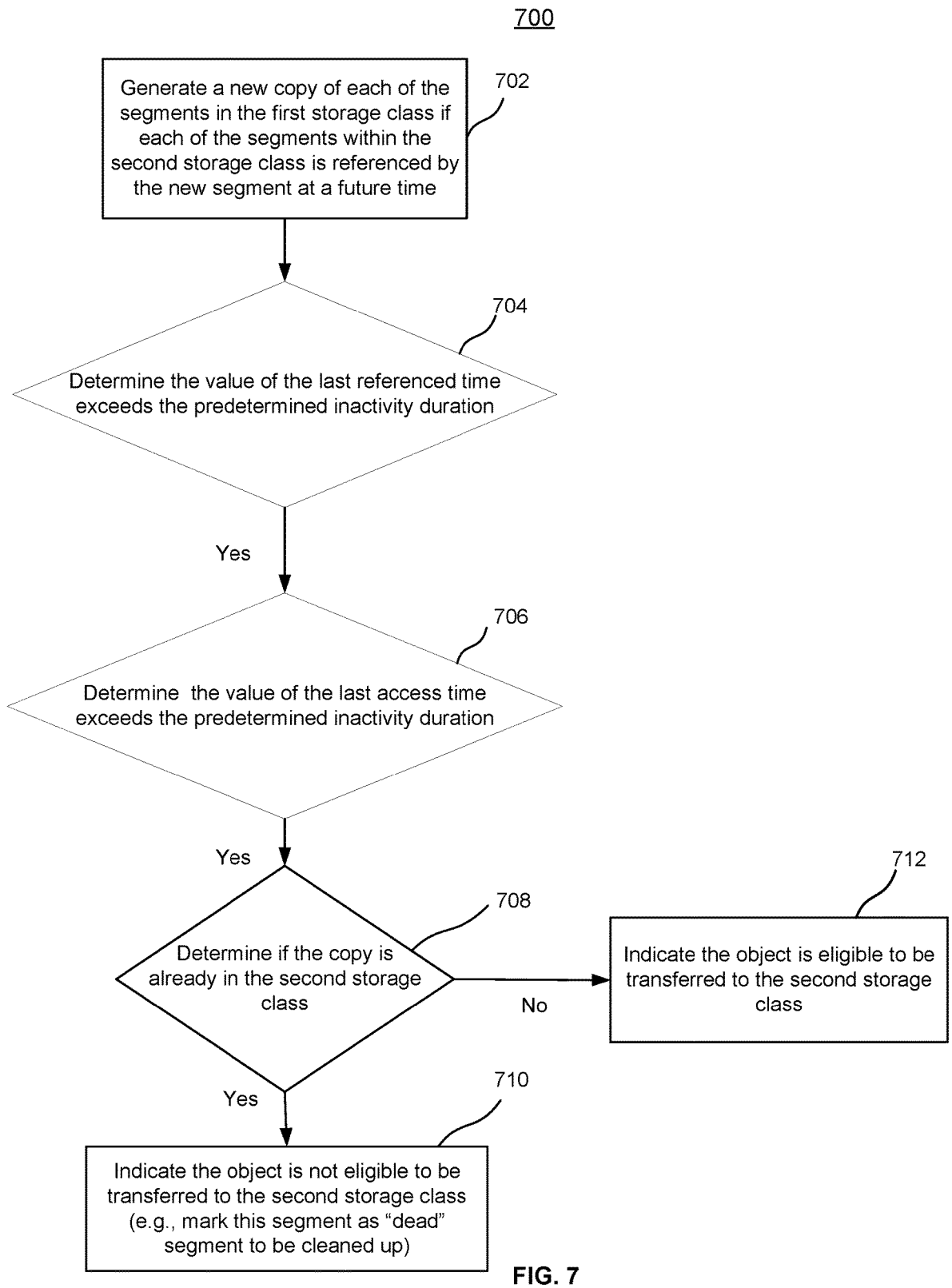
FIG. 7 is a flow diagram illustrating a method for managing a segment that is already moved to a second storage class of the storage provider according to one embodiment.

FIG. 7 is a flow diagram illustrating a method for moving marked objects in a batch operation to a second storage class of the storage provider according to one embodiment. At block 702, the backup server 166 may generate a new copy of each of the segments in the first storage class if each of the segments within the second storage class is referenced by the new segment at a future time.

At block 704, the backup server 166 may determine whether the last referenced time instance when each of the segments is referenced by the new segment exceeds the predetermined inactivity duration.

At block 706, the backup server 166 may determine whether the last accessed time instance when each of the segments is accessed exceeds the predetermined inactivity duration.

At block 708, the backup server 166 may determine whether the new copy of each of the segments in the first storage class is already in the second storage class. For example, the backup server 166 may compare each of the segments within the first storage class and each of the segments within the second storage to ensure a unique segment to be moved to the second storage class. In another embodiment, the deduplication system's segment database or index or catalogue will be referred to quickly to determine if the segment is already in the archival tier or not (e.g., fingerprint checks).

At block 710, in response to determining the new copy of each of the segments in the first storage class is already in the second storage class, the backup server 166 may indicate the object is not eligible to be transferred to the second storage class.

At block 712, in response to determining the new copy of each of the segments in the first storage class is not already in the second storage class, the backup server 166 may indicate that the object is eligible to be moved to the second storage class.

If a segment within an object that is already moved to the archival tier is referenced again by incoming new segments at a future time, the cloud GC may create a new copy of the segment in the standard or regular storage class. If the objects containing such duplicate segments are again found to be not referenced or accessed for more than the predetermined threshold (inactivity duration), then the cloud GC, for example, may mark the object to be transferred to the archival tier. Before moving the marked object to the archival tier, the cloud GC may check and ensure that only unique segments are moved to the archival tier. In this manner, no duplicated segments will be stored in the archival tier. While it is noted that a regular tier might have duplicated segments to preserve locality, duplicated segments are not in the archive tier for long term storage.

If the cloud GC finds that the segment is already in the archival tier (e.g., second storage class), then the cloud GC may mark this segment as a "dead" segment to be cleaned up later because the "dead" segment is not required to be transferred to the archival tier. When transferring objects containing dead segments and segments that are not referenced or accessed (which needs to be moved to archival), for the predetermined threshold (in activity duration) may require the cloud GC to collect unique segments only from the objects and write only the unique segments to new objects in the archive tier and then eventually clean up the source objects.

Figure 8:
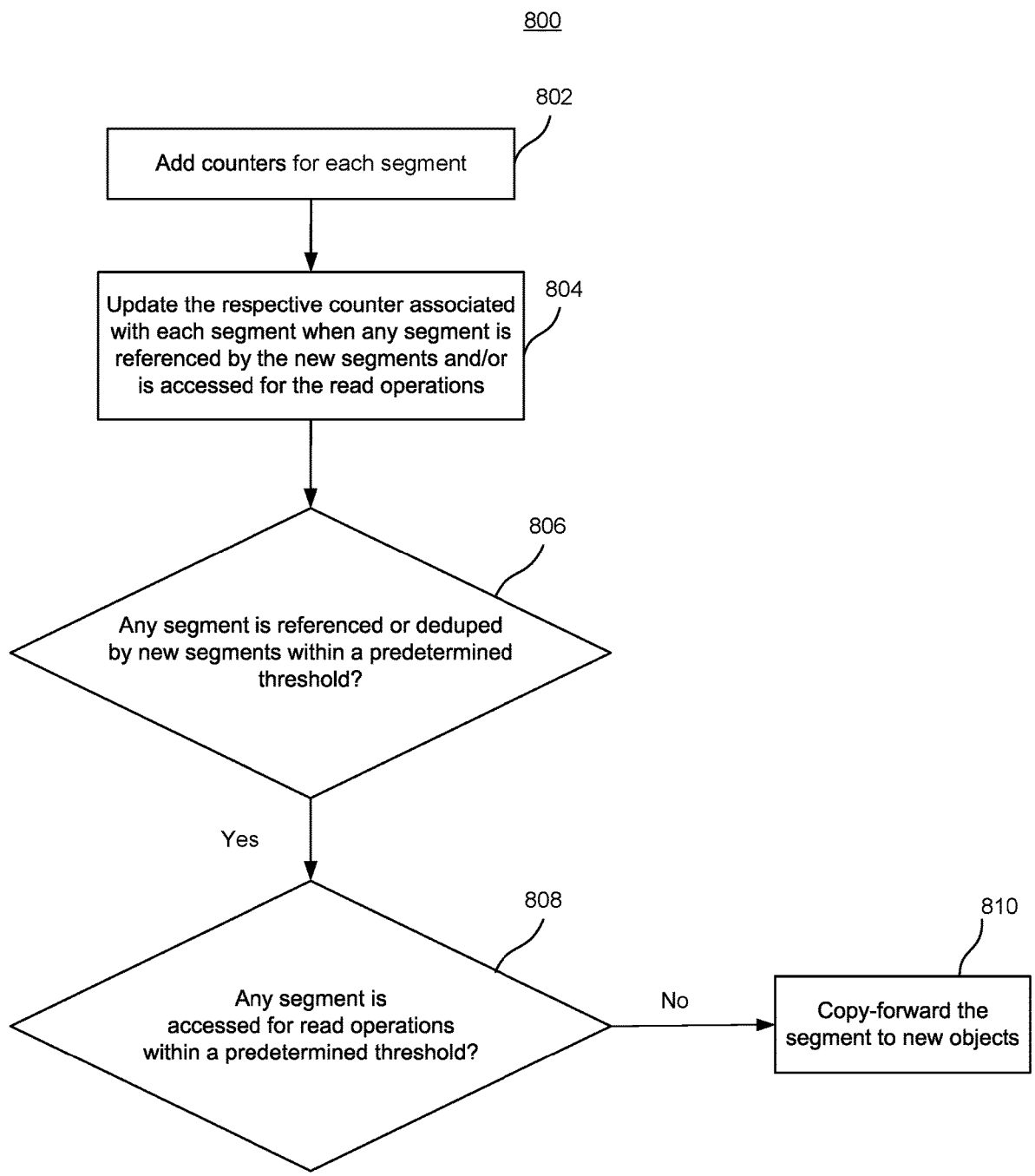
FIG. 8 is a flow diagram illustrating a method for managing an object on a segment level in a storage provider that provides a plurality of storage classes of storage according to one embodiment.

FIG. 8 is a flow diagram illustrating a method for managing an object on a segment level in a storage provider that provides a plurality of storage classes of storage according to one embodiment. Referring now to FIG. 8, at block 802, the backup server 166 may add counters for each segment.

At block 804, the backup server 166 may update a respective counter associated with each segment when any segment is referenced by the new segments and/or is accessed for the read operations.

At block 806, the backup server 166 may determine whether any segment is referenced by the new segments within a predetermined threshold.

At block 808, in response to determining that any segment is referenced by the new segments within the predetermined threshold, the backup server 166 may determine whether any segment is accessed for read operations within the predetermined threshold.

At block 810, in response to determining that any segment is not referenced by the new segments and not accessed for the read operations within the predetermined threshold, the backup server 166 may copy the segment to a new object. The new object may be moved to the second storage class.

Figure 9:
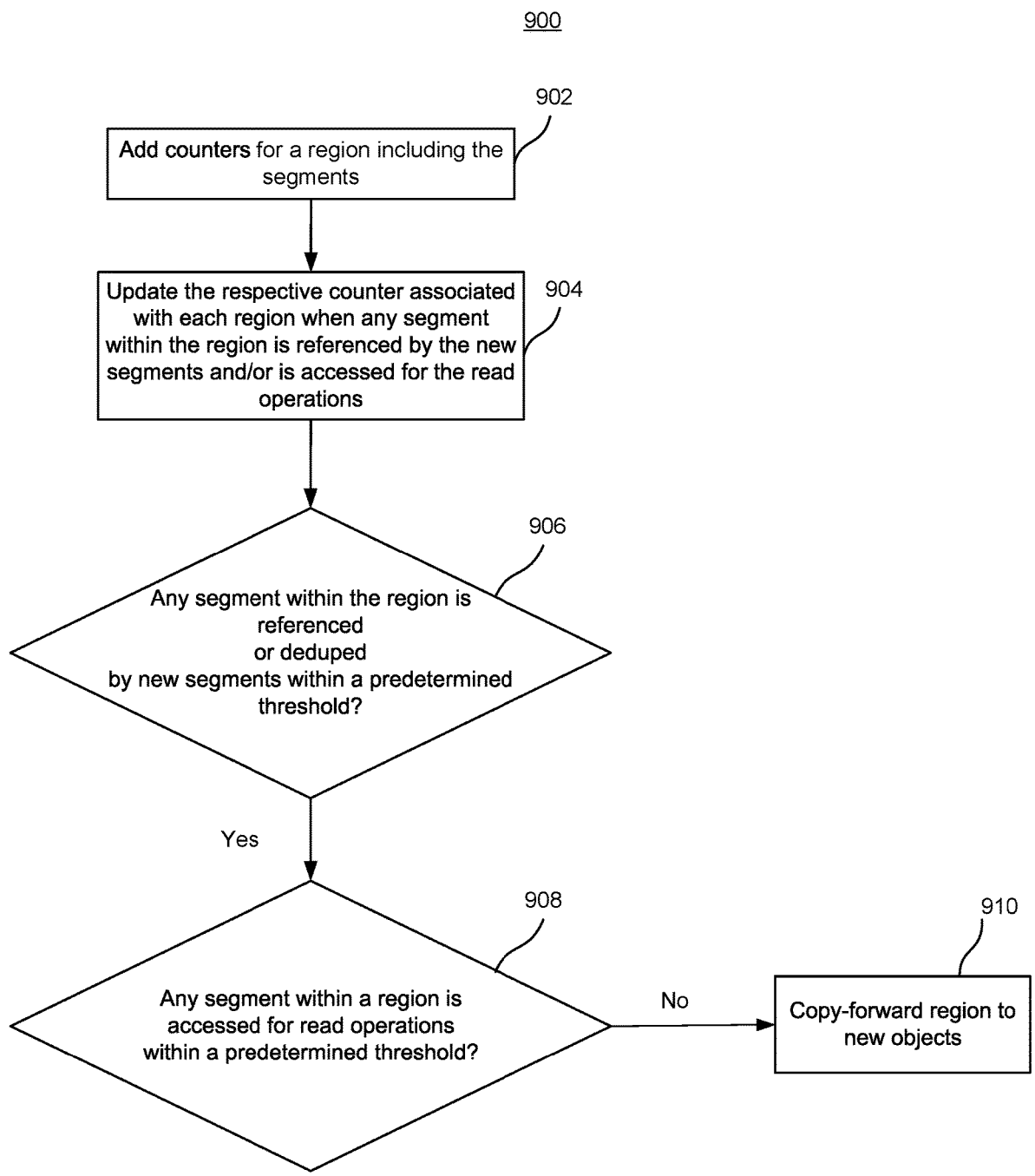
FIG. 9 is a flow diagram illustrating a method for managing an object on a region level in a storage provider that provides a plurality of storage classes of storage according to one embodiment.

FIG. 9 is a flow diagram illustrating a method 900 for managing an object on a region level in a storage provider that provides a plurality of storage classes of storage according to one embodiment.

In one embodiment, a region may include the segments of the object. Referring now to FIG. 9, at block 902, the backup server 166 may add counters for the region including the segments.

At block 904, the backup server 166 may update a respective counter associated with each region when any segment within the region is referenced by the new segments and/or is accessed for the read operations.

At block 906, the backup server 166 may determine whether any segment within the region is referenced by the new segments within a predetermined threshold.

At block 908, in response to determining that any segment within the region is referenced by the new segments within the predetermined threshold, the backup server 166 may determine whether any segment within the region is accessed for read operations within the predetermined threshold.

At block 910, in response to determining that any segment within the region is not referenced by the new segments and accessed for read operations within a predetermined threshold, the backup server 166 may copy the region to a new object. The new object may be moved to the second storage class. That means, the region will only be copied when both any segment within the region is not last referenced and last accessed within the predetermined threshold. The new object will contain only all such regions and then eventually the new object will be moved to archival tier.

Figure 10:
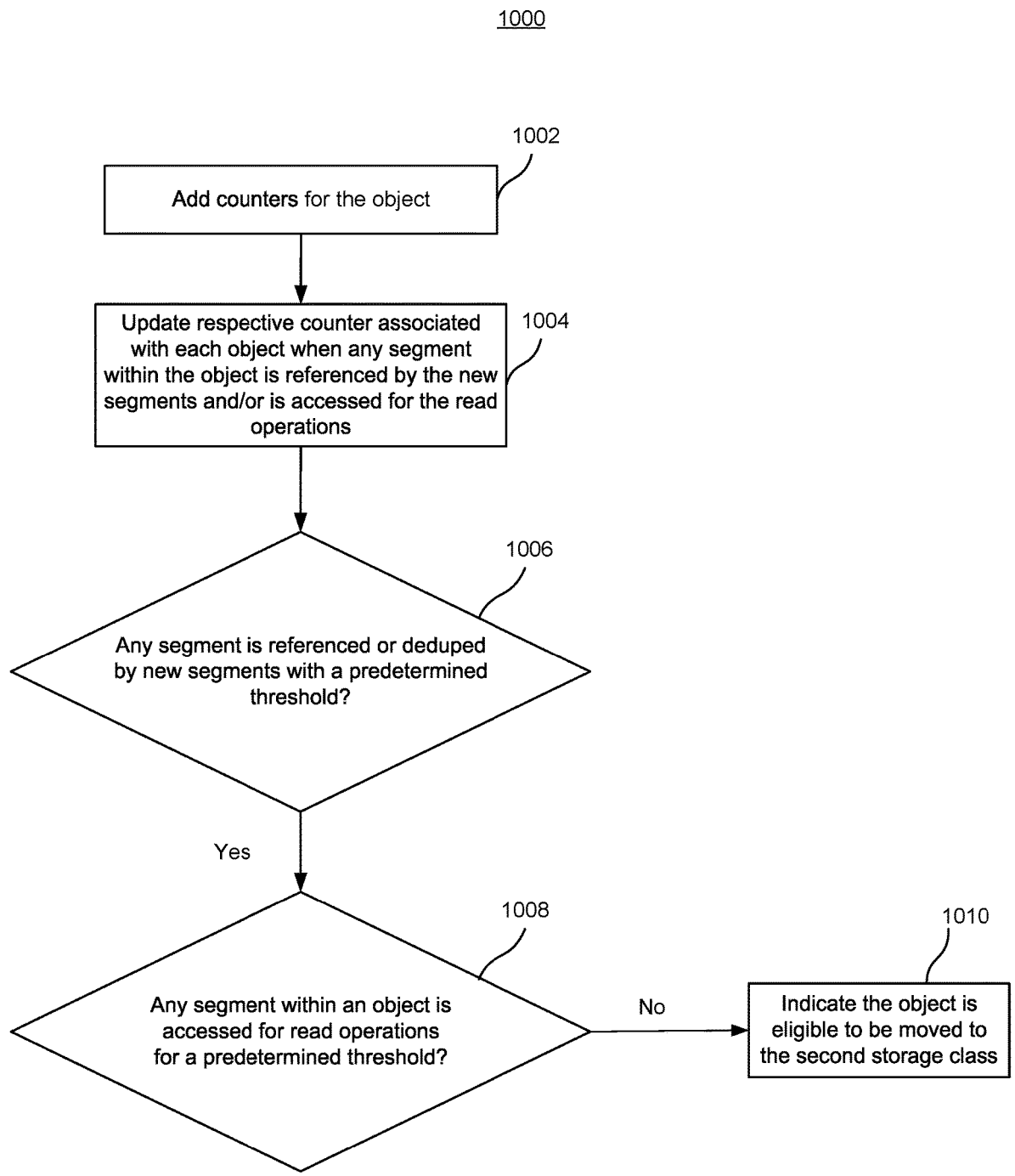
FIG. 10 is a flow diagram illustrating a method for managing an object on a segment level in a storage provider that provides a plurality of storage classes of storage according to one embodiment.

FIG. 10 is a flow diagram illustrating a method for managing at object level in a storage provider that provides a plurality of storage classes of storage according to one embodiment. Referring to FIG. 10, at block 1002, the backup server 166 may add the counters at the object level itself.

At block 1004, the backup server 166 may update a respective counter associated with each segment, when any segment within the object is referenced by the new segments and/or is accessed for the read operations.

At block 1006, the backup server 166 may determine whether any segment within the object is referenced by the new segments within the predetermined threshold.

At block 1008, in response to determining that any segment within the region is referenced by the new segments within the predetermined threshold, the backup server 166 may determine whether any segment within the object is accessed for read operations within the predetermined threshold.

At block 1010, in response to determining that any segment within the object is not referenced by the new segments and not accessed for read operations within a predetermined threshold, the backup server 166 may indicate that the object is eligible to be moved to the second storage class.

The above described process can also be extended to fine-grained tracking and movement such as a region/segment group level and segment level. However, the process described herein can work with any level of coarseness (object level, segment group/region level or even segment level) of tracking and movement.

Regions or segment groups (e.g., compressed regions in DD) may include numerous segments packed together. The backup server 166 may add counters for each region within the object so if any segment within the region is referenced or accessed, the backup server 166 may update a respective counter associated with that region. For any region which is not referenced or accessed within the predetermined threshold (e.g., 30 days), the region may be copy-forwarded to new objects which will be moved to an archival tier later and the remaining "live" regions may be copy-forwarded to another set of new objects in the same standard tier. Eventually, the old objects may be deleted from the standard tier.

In another example, the backup server 166 may add counters for each segment within an object. For all segments that may not be referenced and accessed within the predetermined threshold (e.g., 30 days), these segments may be copy-forwarded to new objects and the remaining "live" objects may be copy-forwarded to another set of new objects in the same standard tier. Eventually, the objects containing the unreferenced segments (i.e., not referenced for 30 days or more) will be moved to the archival tier. Finally, the old objects will be deleted from the standard tier, post proper liveness checks by GC.

Any approach can be implemented using the above described processes depending on the required level of coarseness for controlling the object to be transferred. A fine-grained approach such as segment level counters may incur extra overhead to maintain the counters, but this approach may provide the best control in transferring the segment. On the other hand, object level tracking may incur the least overhead in maintaining the counters, but this approach may provide some form of control over what needs to be transferred to the archival tier. The segment group/region level tracking may be the most optimal approach.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, or flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods described above are in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing a plurality of objects having deduplicated data in a storage provider that provides a plurality of storage classes of storage, the method comprising:
   receiving a request for transfer of the plurality of objects comprising segments from a first storage class to a second storage class of the storage provider;
   storing metadata associated with the plurality of objects, the metadata indicating access characteristics of each of the segments within the plurality of objects, the access characteristics including a last referenced time instance when each of the segments was last referenced by a new segment and a last accessed time instance when each of the segments was last accessed;
   marking each of the plurality of objects for transfer to the second storage class in response to determining that each of the segments satisfies a data storage policy based on the access characteristics of each of the segments within the plurality of objects;
   preparing a manifest list including each of the plurality of objects based on each of the plurality of objects being marked for transfer;
   utilizing the manifest list to invoke a batch operation to transfer each of the plurality of objects from the first storage class to the second storage class of the storage provider;
   generating a new copy of each of the segments in a new object in the first storage class in response to each of the segments within the second storage class being referenced by a second new segment;
   determining whether the last referenced time instance to when each of the segments is referenced by the second new segment exceeds a predetermined threshold;
   in response to determining that the new copy of each of the segments in the first storage class is already in the second storage class, indicating that the new object is not eligible to be transferred to the second storage class; and
   in response to determining that the new copy of each of the segments in the first storage class is not already in the second storage class, indicating that the new object is eligible to be moved to the second storage class.

2. The method of claim 1, wherein determining that each of the segments satisfies the data storage policy based on the access characteristics of each of the segments within the plurality of objects comprises:
   determining that none of the segments are referenced by the new segment for a predetermined time period; and
   determining that none of the segments are accessed for the predetermined time period from the last accessed time instance.

3. The method of claim 1, wherein determining that each of the segments satisfies the data storage policy based on the access characteristics of each of the segments within the plurality of objects comprises:
   determining the last referenced time instance when each of the segments was last referenced by the new segment; and
   determining the last accessed time instance when each of the segments was last accessed.

4. The method of claim 1, wherein marking each of the plurality of objects for transfer to the second storage class of the storage provider comprises:
   updating a flag in one of fields in the metadata associated with each of the plurality of objects.

5. The method of claim 1, further comprising:
   performing a garbage collection (GC) operation or any independent process;
   determining, during the GC operation, that the last referenced time instance when each of the segments was last referenced by the new segment exceeds a predetermined threshold;
   determining, during the GC operation, that the last accessed time instance when each of the segments was last accessed exceeds the predetermined threshold; and
   marking, during the GC operation, each of the plurality of objects for transfer to the second storage class of the storage provider.

6. The method of claim 1, further comprising:
for each object included in the manifest list:
issuing an application programming interface (API) call to transfer the object from the first storage class to the second storage class of the storage provider; and
updating the metadata of the object to indicate that the object is located in the second storage class of the storage provider.

7. The method of claim 1, further comprising:
adding counters for each segment;
updating a respective counter associated with each segment, when any segment is referenced by the new segments and/or is accessed for read operations;
determining whether any segment is referenced by the new segments within a predetermined threshold;
in response to determining that any segment is referenced by the new segments within the predetermined threshold, determining whether any segment is accessed for the read operations within the predetermined threshold; and
in response to determining that any segment is not referenced by the new segments and not accessed for the read operations within the predetermined threshold, copying the segment to a new object, wherein the new object is going to be moved to the second storage class.

8. The method of claim 1, wherein a region comprises the segments of a first object of the plurality of objects, the method further comprising:
adding counters for the region comprising the segments;
updating a respective counter associated with each region, when any segment within the region is referenced by the new segments and/or is accessed for read operations;
determining whether any segment within the region is referenced by the new segments within a predetermined threshold;
in response to determining that any segment within the region is referenced by the new segments within the predetermined threshold, determining whether any segment within the region is accessed for the read operations within the predetermined threshold; and
in response to determining that any segment within the region is not referenced by the new segments and not accessed for the read operations within the predetermined threshold, copying the region to a new object, wherein the new object is going to be moved to the second storage class.

9. The method of claim 1, further comprising:
adding counters for a first object of the plurality of objects;
updating a respective counter associated with each segment, when any segment within the first object is referenced by the new segments and/or is accessed for read operations;
determining whether any segment within the first object is referenced by the new segments within a predetermined threshold;
in response to determining that any segment within the first object is referenced by the new segments within the predetermined threshold, determining whether any segment within the first object is accessed for the read operations within the predetermined threshold; and
in response to determining that any segment within the first object is not referenced by the new segments and not accessed for the read operations within the predetermined threshold, indicating that the first object is eligible to be moved to the second storage class.

10. A non-transitory machine-readable medium having instructions stored therein, which when executed by a processor, cause the processor to perform operations of managing a plurality of objects having deduplicated data in a storage provider that provides a plurality of storage classes of storage, the operations comprising:
receiving a request for transfer of the plurality of objects comprising segments from a first storage class to a second storage class of the storage provider;
storing metadata associated with the plurality of objects, the metadata indicating access characteristics of each of the segments within the plurality of objects, the access characteristics including a last referenced time instance when each of the segments was last referenced by a new segment and a last accessed time instance when each of the segments was last accessed;
marking each of the plurality of objects for transfer to the second storage class in response to determining that each of the segments satisfies a data storage policy based on the access characteristics of each of the segments within the plurality of objects;
preparing a manifest list including each of the plurality of objects based on each of the plurality of objects being marked for transfer;
utilizing the manifest list to invoke a batch operation to transfer each of the plurality of objects from the first storage class to the second storage class of the storage provider;
generating a new copy of each of the segments in a new object in the first storage class in response to each of the segments within the second storage class being referenced by a second new segment;
determining whether the last referenced time instance to when each of the segments is referenced by the second new segment exceeds a predetermined threshold;
in response to determining that the new copy of each of the segments in the first storage class is already in the second storage class, indicating that the new object is not eligible to be transferred to the second storage class; and
in response to determining that the new copy of each of the segments in the first storage class is not already in the second storage class, indicating that the new object is eligible to be moved to the second storage class.

11. The machine-readable medium of claim 10, wherein determining that each of the segments satisfies the data storage policy based on the access characteristics of each of the segments within the plurality of objects comprises:
determining that none of the segments are referenced by the new segment for a predetermined time period; and
determining that none of the segments are accessed for the predetermined time period from the last accessed time instance.

12. The machine-readable medium of claim 10, wherein determining that each of the segments satisfies the data storage policy based on the access characteristics of each of the segments within the plurality of objects comprises:
determining the last referenced time instance when each of the segments was last referenced by the new segment; and
determining the last accessed time instance when each of the segments was last accessed.

13. The machine-readable medium of claim 10, wherein marking each of the plurality of objects for transfer comprises:
updating a flag in one of fields in the metadata associated with each of the plurality of objects.

14. The machine-readable medium of claim 10, the operations further comprising:
performing a garbage collection (GC) operation or any independent process;
determining, during the GC operation, that the last referenced time instance when each of the segments was last referenced by the new segment exceeds a predetermined threshold;
determining, during the GC operation, that the last accessed time instance when each of the segments was last accessed exceeds the predetermined threshold; and
marking, during the GC operation, each of the plurality of objects for transfer to the second storage class of the storage provider.

15. A data processing system, comprising:
a processor; and
a memory to store instructions, which when executed by the processor, causes the processor to perform operations of managing a plurality of objects having deduplicated data in a storage provider that provides a plurality of storage classes of storage, the operations including:
receiving a request for transfer of the plurality of objects comprising segments from a first storage class to a second storage class of the storage provider;
storing metadata associated with the plurality of objects, the metadata indicating access characteristics of each of the segments within the plurality of objects, the access characteristics including a last referenced time instance when each of the segments was last referenced by a new segment and a last accessed time instance when each of the segments was last accessed;
determining, during a garbage collection (GC) operation, that the last referenced time instance when each of the segments was last referenced by the new segment exceeds a predetermined threshold;
determining, during the GC operation, that the last accessed time instance when each of the segments was last accessed exceeds the predetermined threshold;
marking, during the GC operation, each of the plurality of objects for transfer in response to determining that each of the segments satisfies a data storage policy based on the access characteristics of each of the segments within the plurality of objects;
preparing a manifest list including each of the plurality of objects based on each of the plurality of objects being marked for transfer; and
utilizing the manifest list to invoke a batch operation to transfer each of the plurality of objects from the first storage class to the second storage class of the storage provider.

16. The data processing system of claim 15, wherein determining that each of the segments satisfies the data storage policy based on the access characteristics of each of the segments within the plurality of objects comprises:
determining that none of the segments are referenced by the new segment for a predetermined time period; and
determining that none of the segments are accessed for the predetermined time period from the last accessed time instance.

17. The data processing system of claim 15, wherein determining that each of the segments satisfies the data storage policy based on the access characteristics of each of the segments within the plurality of objects comprises:
determining the last referenced time instance when each of the segments was last referenced by the new segment; and
determining the last accessed time instance when each of the segments was last accessed.

18. The data processing system of claim 15, wherein marking each of the plurality of objects for transfer comprises:
updating a flag in one of fields in the metadata associated with each of the plurality of objects.

* * * * *